United States Patent [19]

Deribas et al.

[11] 4,085,883

[45] Apr. 25, 1978

[54] INSTALLATION FOR EXPLOSIVE TREATMENT OF MATERIALS

[76] Inventors: Andrei Andreevich Deribas, ulitsa Pravdy, 1, kv. 20; Alexandr Fedorovich Demchuk, ulitsa Tereshkovoi, 12, kv. 6, both of Novosibirsk; Rudolf Aronovich Braunshtein, prospekt Metallurgov, 34, kv. 28, Novokuznetsk Kemerovskoi oblasti; Boris Nikolaevich Bochkarev, ulitsa Sovetskaya, 79 a, kv. 59, Novosibirsk; Vladimir Borisovich Viktorov, ulitsa Kurako, 4, kv. 48, Novokuznetsk Kemerovskoi oblasti; Gennady Semenovich Karkishko, prospekt Metallurgov, 15, kv. 4, Novokuznetsk Kemerovskoi oblasti; Sergei Vasilievich Baranov, prospekt Metallurgov, 25, kv. 8, Novokuznetsk Kemerovskoi oblasti; Alexandr Ivanovich Prakhov, ulitsa Sheinkmana, 24, kv. 11, Sverdlovsk; Vladimir Semenovich Kasatkin, ulitsa Ordzhonikidze, 2 a, kv. 52, Sverdlovsk; Alexandr Timofeevich Rozhkov, ulitsa Volgogradskaya, 184, kv. 83, Sverdlovsk, all of U.S.S.R.

[21] Appl. No.: 725,505

[22] Filed: Sep. 22, 1976

[51] Int. Cl.² .......................................... B23K 21/00
[52] U.S. Cl. ................................. 228/2.5; 29/421 E; 72/56; 214/89; 425/1
[58] Field of Search ..................... 228/2.5; 29/421 E; 425/1, 78, DIG. 15; 214/89; 89/28 R; 72/56

[56] References Cited

U.S. PATENT DOCUMENTS

| 1,897,863 | 2/1933 | Ruhlemann | 89/28 R X |
| 3,170,202 | 2/1965 | Huston, Sr. et al | 29/421 E X |
| 3,958,739 | 5/1976 | Wicker et al. | 228/44.1 R |

FOREIGN PATENT DOCUMENTS

| 256,723 | 10/1970 | U.S.S.R. | 425/1 |

*Primary Examiner*—Donald G. Kelly
*Assistant Examiner*—K. J. Ramsey
*Attorney, Agent, or Firm*—Fleit & Jacobson

[57] ABSTRACT

An installation for explosive treatment of materials comprises a chamber for accommodation of a work table supporting a material to be treated and an explosive charge. An opening is provided in the chamber wall, and the work table is mounted for reciprocations through the opening for introducing the table into and withdrawing it from the chamber. The work table is made in such a form that it tightly seals the opening upon introduction into the chamber. The chamber walls adjacent to the opening are inclined with respect to the horizontal plane at an angle which is greater than the angle of friction of the material being treated with the chamber walls. Thus, the treated material is fed under gravity to the work table when the table is withdrawn from the chamber.

The construction of such installation gives an opportunity to automatize the process of explosive treatment of materials thereby considerably improving its productivity.

5 Claims, 6 Drawing Figures

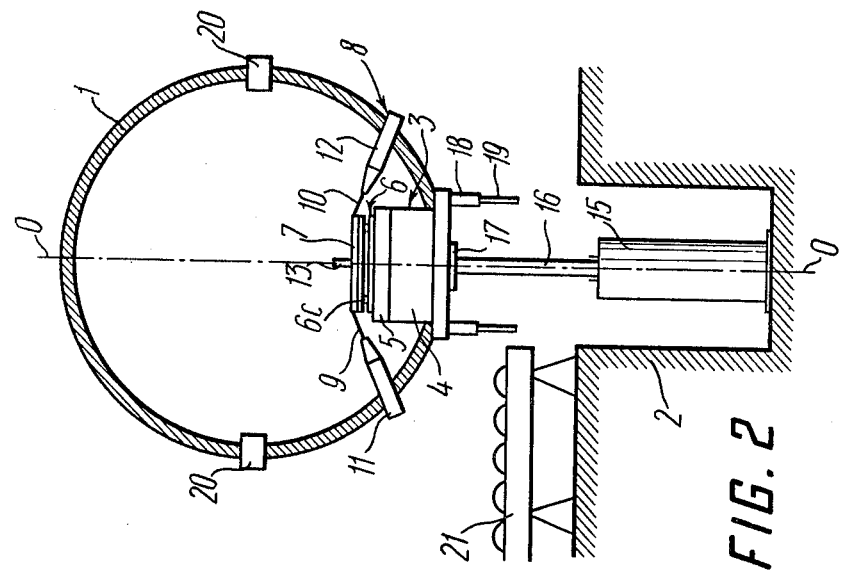
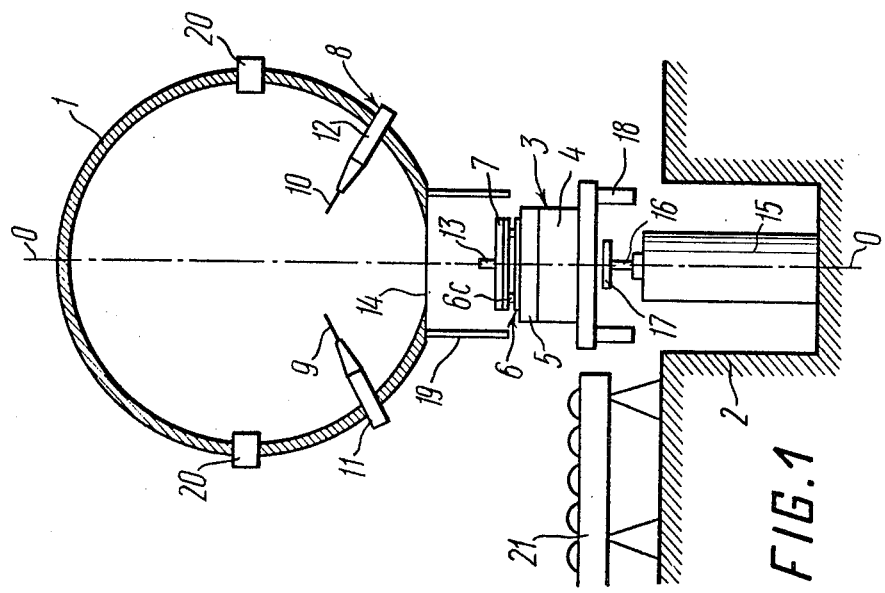

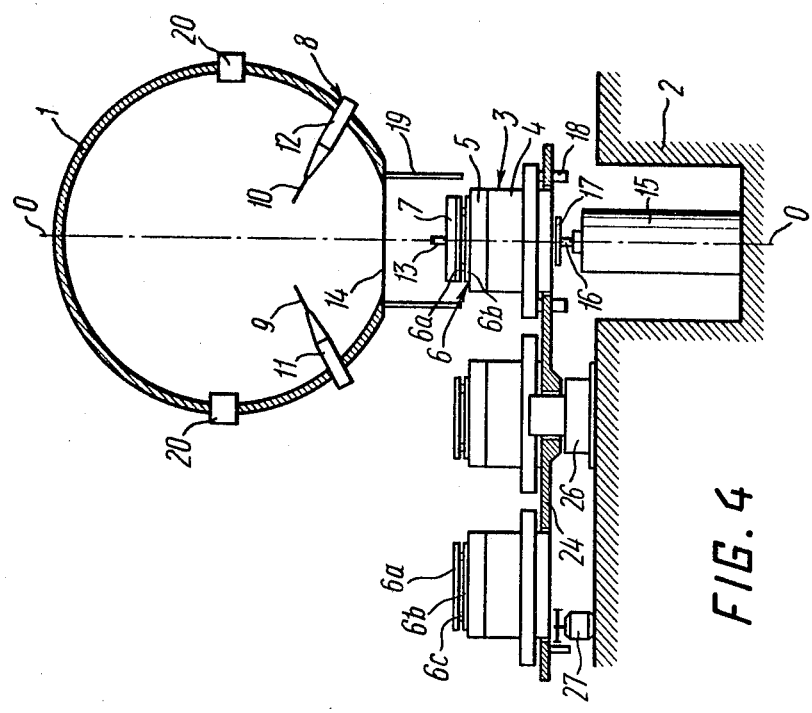
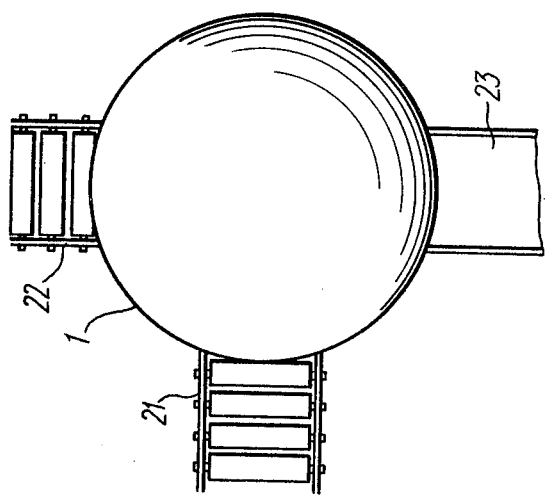
FIG. 4
FIG. 3

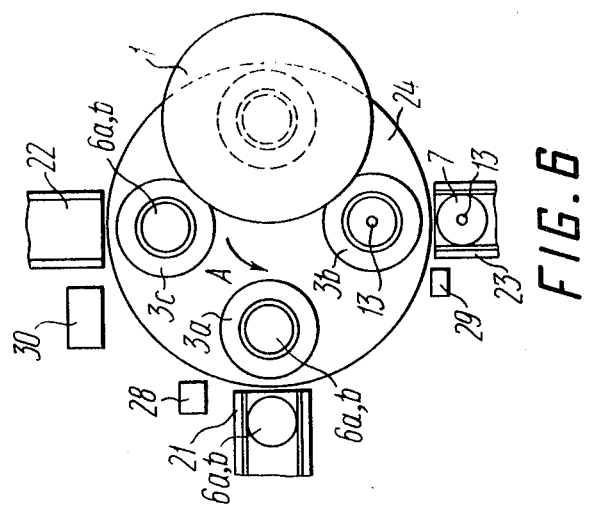
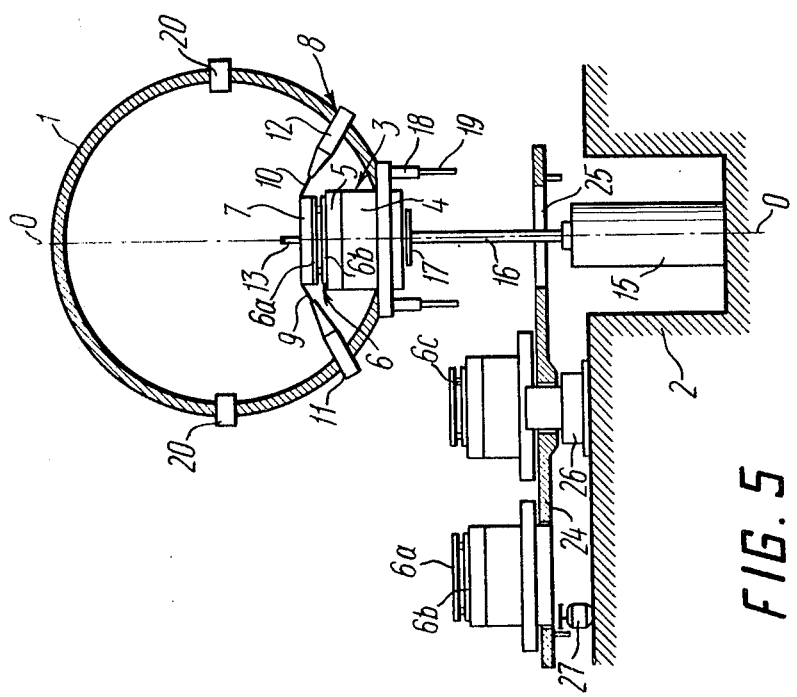

INSTALLATION FOR EXPLOSIVE TREATMENT OF MATERIALS

The present invention relates to installations for explosive treatment of materials.

The installation of the present invention may be used in ferrous and non-ferrous metallurgy, in the aviation and missile industries, in mechanical engineering, instrumentation and other industries.

The installation according to the present invention may be used for manufacturing multilayered composite materials, for welding and cold working of components of mining and constructional equipment, for explosive compression moulding of blanks and components from powders and granular media, and the like.

Explosive treatment of materials, such as in the manufacture of multilayered composite materials to be used in the manufacture of chemical and atomic containment constructions, in the instrumentation, in the aviation and missile industries is presently effected on open sites or in underground chambers.

Explosive treatment of materials in underground chambers is difficult due to limited space available for the work, as well as due to unfavourable conditions for underground operations.

The work on open sites depends to a large extent on the weather conditions and season. The arrangement of open sites for explosive treatment of materials requires occupation of large terrains.

It is known to use surface chambers for experiments in the field of explosive treatment of materials. Known surface chambers are made in the form of hemispheres supported by a stiff foundation which may include or comprise a work table for supporting the material being treated together with an explosive charge and an initiating device. The work table of the chamber is provided with a base and a slab. The chamber wall has a through opening for introduction of the material being treated and an explosive charge incorporating an initiating device and for withdrawing the material from the chamber. The chamber is provided with an initiating system comprising electrodes mounted to the chamber wall. The initiating system is designed for feeding an electric supply pulse to the initiating device which comprises a detonating cap incorporated in the explosive charge applied to the material being treated which is placed on the work table in the chamber.

In known chambers, the work table is mounted stationary. The material being treated is introduced through the opening into the chamber manually or by means of a purpose-built mechanism and is mounted on the work table. After the treatment, the material is withdrawn from the chamber in the same manner.

The main disadvantage of known surface chambers consists in their insufficient productivity.

It is an object of the invention to provide an installation for explosive treatment of materials, in which the construction of the work table is such as to obtain sufficiently high productivity of treatment.

This object is accomplished by that in an installation for explosive treatment of materials, in which a chamber is provided with an opening for introduction of the material being treated and an explosive charge into and for withdrawing them from the chamber, the chamber, accommodating a work table for supporting said material being treated and an explosive charge, as well as a system for initiating the explosion, according to the invention, the opening is provided in the bottom part of the chamber, and the work table is mounted in alignment with the opening for reciprocations for introduction into and withdrawal from the chamber through the opening and is made in such a form that it tightly seals the opening upon introduction into the chamber, the chamber walls adjacent to the opening being inclined with respect to the horizontal plane at an angle which is greater than the angle of friction of the material being treated with the walls of the chamber, whereby the treated material is fed under gravity to the work table when the table is withdrawn from the chamber.

This construction of the installation for explosive treatment of materials enables automation of the introduction of the work table supporting the material being treated and explosive charge into the chamber and of the withdrawal of the treated materials from the chamber. At the same time, this construction provides for introduction of the work table into the chamber and sealing of the chamber, whereby the time for preparation of the chamber for the treatment process is reduced. Due to the above-mentioned inclination of the side walls of the chamber with respect to the horizontal plane the treated material can be fed to the work table under gravity, which is important because the material may get thrown to any point within the chamber during the treatment. This facility is favourable for automatic removal of the treated material from the chamber concurrently with the withdrawal of the work table.

A drive for effecting the reciprocations of the work table preferably comprises a hydraulic cylinder having a piston rod cooperating with the work table for introduction thereof into and withdrawal thereof from the chamber.

This construction of the drive enables the introduction of the work table into and its withdrawal from the chamber by means of a simple and reliable device.

The installation is preferably provided with two conveyors: one conveyor is used for feeding the material being treated to the work table and the other conveyor — for removing the treated material from the work table, the conveyors being mounted in such a manner that their ends are located adjacent to the work table when the latter is in the lowermost position.

This facility enables automation of the process of feeding the material being treated to the work table and removing it from the work table.

The installation is preferably provided with a plurality of work tables and a multi-station step table supporting these tables which is mounted for rotation adjacent to the chamber in such a manner that each work table can be alternately brought in alignment with the chamber opening.

The provision of a plurality of work tables in the chamber enables an improvement of productivity in treating large quantities of materials.

The employment of a multi-station table enables a concurrent performance of a number of operations for preparation of materials prior to the treatment, such as placing the material on the work table; applying an explosive charge to the material being treated; incorporating an initiating device in the explosive charge, as well as introducing the work table into and withdrawing it from the chamber.

The installation for explosive treatment of materials according to the invention provides for automation of the process of introduction of the material being treated into the chamber and its withdrawal from the chamber by using simple and reliable devices which, in turn, enables automation of the entire process of explosive treatment thereby considerably improving the productivity.

Besides, the installation according to the invention is safe and reliable in operation and does not require large production areas which makes it possible to use it for various kinds of explosive treatment of materials in conventional manufacturing workshops.

The installation for explosive treatment of materials according to the invention is sufficiently simple in structure and inexpensive in manufacture.

The invention will now be described in details with reference to specific embodiments of the installation illustrated in the accompanying drawings, in which:

FIG. 1 diagrammatically shows the installation for explosive treatment of materials according to the invention, partially in section with the work table in the lowermost position;

FIG. 2 shows the same as in FIG. 1, but with the work table introduced into the chamber;

FIG. 3 is the same arrangement in a plan view;

FIG. 4 diagrammatically shows the installation according to the invention, partially in section, in the embodiment with a plurality of work tables and with a multi-station table supporting them, each work table occupying the lowermost position, and the conveyors are not shown;

FIG. 5 shows the same as in FIG. 4, but one work table is introduced into the chamber;

FIG. 6 shows the same as in FIG. 4 in a plan view.

The installation for explosive treatment of materials according to the invention has a chamber 1 (FIGS. 1, 2) mounted on a fixed support 2 by means of support columns (not shown).

The installation comprises a work table 3 having a base 4 and a slab 5 for supporting thereon a material 6 to be treated. An explosive charge 7 in this embodiment is applied to the material 6 being treated.

In the installation for explosive treatment of materials there is provided an initiating system 8 comprising electrodes 9, 10 arranged in electrode holders 11, 12 incorporated in the wall of the chamber 1. The electrodes 9, 10 are designed for feeding an electric supply pulse from a source (not shown) to a device 13 for initiating an explosion which in this particular case comprises a conventional electric detonating cap incorporated in the explosive charge 7 applied to the material 6 being treated.

An opening 14 is provided in the wall of the chamber 1, and the work table 3 can be introduced into and withdrawn from the chamber 1 through this opening. The base 4 of the work table 3 is made in such a form that it tightly seals the opening 14 upon introduction of the work table into the chamber 1 thereby providing the sealed conditions in the chamber during the explosive treatment of materials.

The walls of the chamber 1 adjacent to the opening 14 are inclined with respect to the horizontal plane at an angle which is greater than the angle of friction of the treated material with the chamber walls.

Due to this facility, the material 6 which may get thrown during the explosive treatment to any point within the chamber is fed under gravity to the slab 5 of the work table 3 when the table is withdrawn from the chamber 1.

The work table 3 is mounted for reciprocations toward and away from the chamber 1 on the fixed support 2 for introducing and withdrawing the material being treated.

The reciprocations of the work table 3 are effected by means of a drive comprising a hydraulic cylinder 15 having a piston rod 16 supporting a pusher 17. The pusher 17 is designed for cooperation with the base 4 of the work table 3, whereby the reciprocations of the work table 3 are effected.

The base 4 of the work table 3 supports guide sleeves 18, and guide rods 19 having their ends fixed to the wall of the chamber 1 adjacent to the opening 14 and designed for guiding the work table 3 during the movement are slidably received in the guide sleeves.

The wall of the chamber 1 incorporates a ventilation system 20 for removing the products of detonation of the explosive charge from the chamber 1. The ventilation system 20 is of any appropriate design.

The installation for explosive treatment of materials has a conveyor 21 for feeding the material 6 being treated to the slab 5 of the work table 3 and a conveyor 22 (FIG. 3) for removing the treated material 6 from the work table 3. In this embodiment of the invention, the conveyors 21, 22 comprise roller tables horizontally mounted on the fixed support 2 in such a manner that the ends thereof are located adjacent to the work table 3 when the latter is in the lowermost position.

The installation according to the invention is provided with a conveyor 23 for feeding the explosive charge 7 (FIGS. 1, 2) with the detonating cap 13 incorporated therein, to the work table 3 for applying the charge to the material 6 being treated.

The conveyor 23 (FIG. 3) is mounted on the fixed support 2 in such a manner that the output end thereof is positioned adjacent to the work table 3 when the latter is in the lowermost position. The conveyor 23 may be of any appropriate design.

The installation for explosive treatment of materials in accordance with another embodiment of the invention comprises a plurality of work tables 3 as shown in FIGS. 4, 5, 6 and a step multi-station table 24 (FIG. 4) for supporting the work tables. The multi-station table 24 has recesses 25 (FIG. 5) for accommodation of the work tables 3.

The multi-station table 24 is mounted adjacent to and under the chamber 1 on an axle 26 which is secured to the fixed support 2.

The multi-station table 24 has an electric drive 27 mounted on the fixed support 2 to rotate the multi-station table 24 through one step at each cycle of explosive treatment of the material 6. Thus, each work table 3 is alternately brought in alignment with the opening 14 of the chamber 1.

The explosive treatment of materials with the employment of the installation according to the invention in the embodiment with the multi-station table will now be described as applied to explosive welding of two plates 6a, 6b positioned in a spaced relationship to each other, the members 6c being provided to maintain the spaced relationship of the plates 6a and 6b.

In the initial position of the installation, the work table 3 is in the lowermost position, as shown in FIG. 5, and the chamber 1 is unsealed.

An operator puts on the conveyor 21 for feeding the material 6 being treated, that is the plates 6a and 6b in this particular case, to the work table at the station 3a (FIG. 6) which is mounted adjacent to the output end of the conveyor 21 and received in a respective recess 25 of the multi-station table 24. Then the operator puts on the conveyor 23 for feeding the explosive charge 7 to the work table which is in a station 3b adjacent to the output end of this conveyor, and the conveyor 22 for removing the treated material 6 from the work table which is at a station 3c adjacent to the input end of this conveyor.

By using an automatic device 28 (FIG. 6) of any appropriate design, the plates 6a, 6b are placed on the slab 5 of the work table 3 which is at the station 3a. Using the drive 27, the multi-station table 24 is rotated about the axle 26 as shown by arrow A in FIG. 6 through one step. As a result, the plates 6a and 6b are positioned adjacent to the end of the conveyor 23, and the work table supporting them is now at the station 3b. Then the explosive charge incorporating the detonating cap 13 is removed from the conveyor 23 and transferred to the upper plate 6a by means of an automatic device 29 (FIG. 6) of any appropriate design.

The multi-station table 24 is again rotated through one step in the same direction as shown by arrow A. As a result, the work table 3 supporting the plates 6a, 6b and the explosive charge 7 incorporating the detonating cap 13 is brought in alignment with the opening 14 of the chamber 1 as shown in FIG. 4. The hydraulic cylinder 15 is automatically actuated, the piston rod 16 is displaced forward from the cylinder 15, and the pusher 17 mounted at the end thereof is urged against the base 4 of the work table 3. During further displacement, the work table 3 moves, together with the piston rod 16 and pusher 17 upwards toward the chamber 1 until it takes the upmost position shown in FIG. 5. In this position, the base 4 of the work table 3 closes the opening 14 of the chamber 1 to seal it.

After the work table 3 supporting the plates 6a, 6b, the explosive charge 7 and the electric detonating cap 13 incorporated in the explosive charge 7 is completely introduced into the chamber 1, the initiating system 8 is automatically actuated so that the electrodes 9 and 10 are fed to the electric detonating cap 13 to complete the electric circuit with its contacts.

Then an electric pulse is fed to the electric detonating cap 13 from a supply source (not shown), and an explosion occurs.

Detonation products of the explosion displace the plate 6a to the plate 6b at a high speed, the members 6c being removed from the space between the plates by a cumulative jet. The plates hit each other, and the welding takes place.

The ventilation system 20 cleans the chamber 1 from the detonation products of the explosive charge 7.

Then the hydraulic cylinder 15 is again actuated so that the piston rod 16 is retracted therein, and the pusher 17 is displaced, together with the work table 3, downwards into the lowermost position.

The plates 6a, 6b welded by the explosion may get thrown to any point within the chamber. Under the action of gravity, the plates 6a, 6b will get in the bottom part of the chamber 1 adjacent to the work table 3. As the work table 3 is withdrawn from the chamber 1, the explosion welded plates 6a, 6b are fed to the slab 5 of the work table 3 due to the fact that the walls of the chamber 1 adjacent to the opening 14 are inclined to the horizontal plane at an angle which is greater than the angle of friction of the plates 6a, 6b with the walls of chamber 1.

When in the lowermost position, the work table 3 is again received in the recess 25 of the multi-station table 24, and the pusher 17 is disengaged from the base 4 of the work table 3. The multi-station table 24 is again rotated through one step in the same direction as shown by arrow A so that the work table 3 is positioned adjacent to the conveyor 22 for removing the plates 6a, 6b at the station 3c. An automatic device 30 (FIG. 6) removes the plates 6a, 6b from the work table 3 and transfers them to the conveyor 22 for delivery from the installation.

At the same time, the next work table 3 is brought in alignment with the opening 14 of the chamber 1 to perform the next explosive welding cycle.

Comprehensive tests have been conducted with an experimental prototype of the installation for explosive treatment of materials according to the invention, and the test results confirmed high productivity of installation. The installation occupies a small production area and may be used in conventional workshops. Materials treated in the installation according to the invention were of good quality.

What is claimed is:

1. An installation for explosive treatment of materials comprising: a fixed support; a chamber mounted on said fixed support; an opening provided in the wall of said chamber in the bottom part thereof; a work table for supporting the material being treated, the work table being adapted for reciprocal movement between a lowermost position out of engagement with the sides of said opening and an upmost position tightly sealing said opening; an explosive charge on said work table; a system for initiating an explosion; a drive for effecting the reciprocal movements of said work table mounted on said fixed support; said work table being made in such a form that, upon introduction into said chamber, it tightly seals said opening; the walls of said chamber adjacent to said opening being inclined to the horizontal plane at an angle which is greater than the angle of friction of the treated material with the walls of said chamber, whereby the treated material is fed under gravity to said work table while the latter is being withdrawn from said chamber; a ventilation system mounted in said chamber for removing detonation products of said explosive charge.

2. An installation according to claim 1, wherein a drive for effecting the reciprocal movements of said work table comprises a hydraulic cylinder having a piston rod cooperating with said work table for moving it between said lowermost and said upmost positions.

3. An installation according to claim 1, wherein there are provided two conveyors: one conveyor being used for feeding the material being treated to said work table, and the other conveyor being used for removing the treated material from the work table, the conveyors being mounted in such a manner that their ends are located adjacent to the said work table when the latter is in the lowermost position.

4. An installation according to claim 1, wherein there are provided a plurality of said work tables and a step multi-station table accommodating said work tables which is mounted adjacent to and under said chamber for rotation so that each work table can be alternately brought in alignment with said opening of said chamber.

5. An installation according to claim 4 wherein there are provided a plurality of conveyors operatively associated with said multi-station table, one of said conveyors being adapted to deliver to a first station on said multi-station table material to be explosively treated, a second of said conveyors being adapted to deliver to a second station an explosive charge to be applied to the material to be explosively treated, a third of said conveyors being adapted to remove from a third station on said multi-station table treated material.

* * * * *